US006686906B2

United States Patent
Salminen et al.

(10) Patent No.: US 6,686,906 B2
(45) Date of Patent: Feb. 3, 2004

(54) TACTILE ELECTROMECHANICAL DATA INPUT MECHANISM

(75) Inventors: Seppo Juhani Salminen, Turku (FI); Terho Otso Tapio Kaikuranta, Piispanristi (FI)

(73) Assignee: Nokia Mobile Phones Ltd., Espoo (FI)

( * ) Notice: Subject to any disclaimer, the term of this patent is extended or adjusted under 35 U.S.C. 154(b) by 155 days.

(21) Appl. No.: 09/885,202

(22) Filed: Jun. 20, 2001

(65) Prior Publication Data
US 2002/0000976 A1 Jan. 3, 2002

(30) Foreign Application Priority Data
Jun. 26, 2000 (FI) ................................. 20001510

(51) Int. Cl.$^7$ ................................. G09G 5/00
(52) U.S. Cl. ................. 345/169; 345/173; 200/5 A
(58) Field of Search ................. 345/168, 169, 345/173, 156, 157, 170, 171, 172; 200/5 A, 6 A, 5 R; 341/22, 23, 26; 455/466, 575.1, 556.1, 556.2

(56) References Cited

U.S. PATENT DOCUMENTS

| | | | | |
|---|---|---|---|---|
| 4,127,752 A | * | 11/1978 | Lowthorp ................. 200/5 A |
| 5,113,047 A | * | 5/1992 | Tsutsumi ................. 200/407 |
| 5,430,262 A | * | 7/1995 | Matsui et al. ............. 200/5 A |
| 5,598,527 A | * | 1/1997 | Debrus et al. ............. 345/173 |
| 5,621,196 A | * | 4/1997 | Nishijima et al. ........... 200/6 A |
| 5,680,160 A | * | 10/1997 | LaPointe ................... 345/173 |
| 5,900,829 A | * | 5/1999 | Gardner et al. ............... 341/26 |
| 6,058,304 A | * | 5/2000 | Callaghan et al. .......... 455/422 |
| 6,243,080 B1 | * | 6/2001 | Molne ..................... 345/173 |
| 6,246,019 B1 | * | 6/2001 | Nakamura et al. .......... 200/6 A |
| 6,297,810 B1 | * | 10/2001 | Anderson ................. 345/173 |
| 6,369,801 B2 | * | 4/2002 | Boireau et al. ............. 345/169 |

FOREIGN PATENT DOCUMENTS

| | | |
|---|---|---|
| WO | WO 98/29886 | 7/1998 |
| WO | WO 00/25332 | 5/2000 |

* cited by examiner

Primary Examiner—Xiao Wu
(74) Attorney, Agent, or Firm—Perman & Green, LLP

(57) ABSTRACT

An electromechanical data input mechanism 200, 700, 750 comprises a first structural entity 210, 710, having a first surface 211 and a conductive coupling area 107 on said first surface, and a second structural entity 220, 720 having a second surface 212 located adjacent to said first surface and separated therefrom by a gap. It further comprises a dome-like member 102 adjacent to said conductive coupling area, and extending from the second surface, an actuator 105 adjacent to the dome-like member. The mechanism is characterized in that within an pressing area elastic properties of the second structural entity are substantially uniform and said first and second structural entities are kept apart from each other solely through the dome-like members, and said first and second structural entities are arranged to move with respect to each other so that under the influence of a force pressing them towards each other, the actuator moves towards the dome-like member.

44 Claims, 4 Drawing Sheets

TACTILE ELECTROMECHANICAL DATA INPUT MECHANISM

TECHNOLOGICAL FIELD

The invention relates in general to data input mechanism related to an electrical device. In particular the invention relates to an input mechanism especially suitable for small portable communication devices.

BACKGROUND OF THE INVENTION

A push button or a press key consists of a certain mechanical structure and of an accompanying electrical circuitry. When a user presses a push button or a key of an electrical device, the pressing of a button is converted to an electrical input signal for the device. Typically the mechanical part of a push button requires more space than the accompanying electrical circuitry.

A typical user interface of a portable electrical device comprises at least few push buttons or keys. In a mobile phone, for example, there typically is a display, push buttons for the digits and some push buttons for choosing proper action. As portable electrical devices become smaller and smaller, there is less space for the push buttons. Consider, for example, a communication device that has the shape of a watch, a pen or a pendant.

One solution is to reduce the size of push buttons, but this may result in devices that are difficult to use. Calculator watch having very small push buttons is one example of a device, whose usability is not very good. Another straightforward solution is to reduce the number of the push buttons. The problem here is that although the size of portable communication devices becomes smaller, the functionality such devices is usually similar as that of devices having larger size. Therefore it usually is not feasible to reduce the number of push buttons. Further reasons for reducing the number of push buttons are, for example, the aim to design classy devices and the aim to obtain a simple and robust structure.

A prior art push button or keyboard, where the pressing of a button is converted into an electrical signal, works usually in the following way. When a button is pressed down, an electrical contact is formed between two conductor strips, and when a button is in the rest position, there is no electrical contact between the conductor strips. Typically the mechanical structure of a push button is such that it automatically returns to the rest position (up position), when a user stops pressing the button.

FIG. 1 shows a cross section of a typical push button structure according to prior art. A button 104 typically has an upper part having a smaller diameter and a base, which has a larger diameter and is hollow. The button refers here to the plain button 104, and term push button refers to the whole mechanical construction including the button 104. The surface of a button 104, which faces the circuit board 101, is typically a circular rim. In the bottom of a button 104 there is a hole, which allows the housing of a dome 102. When the button is in the up position, there is room for the dome 102 to be in its normal position. The button 104 has an actuator 105, which presses the dome 102 down when the button 104 is pressed down. The dome 102 acts as a spring, and as a user stops pressing the button 104 down, the dome returns to its normal position and simultaneously pushes the button back to the up position. The actuator 105 is necessary, because if the whole surface of the button 104 would be pressed against the dome 102, the spring effect of the dome 102 might be lost and the force needed to press the lower surface of the dome in contact with the circuit board 101 would be larger than when an actuator 105 is used. Typically the upper part of the button 104 is rigid, and the movement of the button 104 in the vertical direction is due to the thin rim connecting the upper part and the base of the button 104. The material of the button 104 has to be elastic enough for allowing the rim to flex. A button 104 can be made, for example, of rubber.

The circuit board 101 comprises the necessary circuitry for detecting the pressing of a button 104. A conductive area in the lower surface of the dome 102 is pressed against, for example, two conductor strips 107, and an electrical contact between the conductor strips indicates the pressing of a button. If the whole dome is made of conductive material, there may be a separate isolating layer 103 to isolate the rim of the dome from the conductive strips. Another way to isolate the rim of the dome from the circuitry is to use multilayer circuit board. A further option is to make the dome of an isolating material and to deposit a conducting layer in a suitable area of the concave surface of the dome 102.

FIG. 1 shows also a cover 106, which has holes for the buttons. Typically the profile of a cover is not uniform to minimize the material needed for the cover and the mass of the cover. The height of a button 104 is usually few millimeters. The buttons of a keyboard are typically connected to each other at their base parts and they form a key mat. Typically it is quite difficult to obtain a waterproof push key mechanism, because it is difficult to fix a cover, which may have a non-uniform profile, and a key or a key mat to each other tightly.

In a mobile communication device there is typically a keyboard for inputting digits, some separate push buttons and a display in the front surface of the device. The smaller the device, the smaller usually the front surface and the less space for the display and the various push buttons. It typically is necessary to reserve enough room, for example, for the display. If the push buttons are made too small, it is difficult to press a correct button. Therefore reducing the size of the buttons is not a good solution. Furthermore, having many small buttons in a small device usually does not give the impression of a classy, well-designed device. The mechanical structure of small push buttons may also cause some problems. These problems arise also if small push buttons are placed in the side surface of a device. Another solution is to reduce the number of the push buttons, but unfortunately the functionality of communication devices is typically so versatile that to use conveniently a communication device, the device typically has to have at least few push buttons.

For design purposes and for achieving waterproof device, it may be advisable to eliminate the need for push buttons. One way to do this is to use a touch sensitive display. The advantages of a touch sensitive screen include at least the freedom to design a device without push buttons and to use the same area both as a display and as an input means. The disadvantages of such a display are that it is relatively expensive and that is lacks the tactile feel of a push button. The user cannot feel when he is pressing a key, or actually pointing a certain position on the display. The sense of pressing a button typically makes the use of a device more comfortable.

Patent application WO 98/29886 presents a way to integrate push button functionality and a display. A first plate of the display structure is arranged, using hinges, to tilt when the display is pressed. The first plate has conductive actuators extending from one surface and there are corresponding conductive coupling areas on the surface of a second plate. The display can be mounted so that the first plate can be tilted around an axis. This way it is possible to place two conductive actuators to the first plate. If the first plate is supported in one point in the middle of the plate, more conductive actuators, for example four, can be placed to the first plate. A contact between a conductive actuator and a conductive coupling area is made by tilting the first plate. The construction of the virtual touch screen presented in WO 98/29886 is complex and requires many separate parts. It is therefore most probably quite a difficult and expensive solution. Furthermore, it is not easy to make a waterproof device using this virtual touch screen.

SUMMARY OF THE INVENTION

An object of the invention is to present a data input mechanism, which acts as a set of push buttons or as a keyboard and also as another part of an electrical device. A further object of the invention is a data input mechanism, which preserves the tactile feel related to push buttons. A further object of the invention is a data input mechanism, which acts as a display and a set of push buttons. Preferably the data input mechanism is waterproof and simple to construct.

Objects of the invention are achieved by covering the domes relating to an electromechanical data input mechanism with a single movable part, which comprises actuators and is kept apart from a second part, which comprises conductive coupling areas related to domes, through the domes.

An electromechanical data input mechanism according to the invention comprises a first structural entity, a second structural entity arranged to move with respect to said first structural entity, as a part of said first structural entity, a first surface, as a part of said second structural entity, a second surface located adjacent to said first surface and separated therefrom by a gap, a conductive coupling area on said first surface, between said first and second surfaces and adjacent to said conductive coupling area a dome-like member having a conductive surface adjacent to the conductive coupling area, and extending from the second surface, an actuator located adjacent to each dome-like member, and provides a pressing area, for exerting a force pressing the first and second structural entities towards each other, substantially within which pressing area the dome-like member is located, and the mechanism is characterized in that within the pressing area, elastic properties of the second structural entity are substantially uniform, said first and second structural entities are within the pressing area kept apart from each other solely through the dome-like members, and under the influence of a pressing force exerted on an area within the pressing area and pressing the first and second structural entities towards each other, said first and second structural entities are arranged to move, with respect to each other, so that the actuator moves towards the dome-like member.

The invention relates also to an electronic device comprising an electromechanical data input mechanism, which electromechanical data input mechanism comprises a first structural entity, a second structural entity arranged to move with respect to said first structural entity, as a part of said first structural entity, a first surface, as a part of said second structural entity, a second surface located adjacent to said first surface and separated therefrom by a gap, a conductive coupling area on said first surface, between said first and second surfaces and adjacent to said conductive coupling area a dome-like member having a conductive surface adjacent to the conductive coupling area, and extending from the second surface, an actuator located adjacent to the dome-like member, and which mechanism provides a pressing area for exerting a force pressing the first and second structural entities towards each other, substantially within which pressing area the dome-like member is located, and the electronic device being characterized in that within the pressing area, elastic properties of the second structural entity are substantially uniform, said first and second structural entities are within the pressing area kept apart from each other solely through the dome-like members, and under the influence of a pressing force exerted on an area within the pressing area and pressing the first and second structural entities towards each other, said first and second structural entities are arranged to move, with respect to each other, so that the actuator moves towards the dome-like member.

An electromechanical data input mechanism according to the invention comprises two structural entities, which are typically substantially plate-like at least at the pressing area, and the actuators relating to the input mechanism are part of the second structural entity. It further comprises at least one dome-like member between a first surface, which is a part of the first structural entity, and a second surface, which is a part of the second structural entity. At least one actuator extends from the second surface, and there is at least one connective coupling area on the first surface. There is a gap between the first and second surfaces and the dome-like member is adjacent both to a respective actuator and to a respective conductive coupling area. Each dome-like member has a conductive are facing the respective conductive coupling area.

When a force, which presses the first and second structural entities towards each other is exerted, the first and second structural entities are arranged to move with respect to each other. The first and second structural entities are kept apart from each other by the dome-like members within the pressing area. Outside the pressing area it is possible that the first and second structural entities are mechanically coupled to each other. Despite a possible mechanical coupling outside the pressing area, the dome-like members dictate at lower limit for the distance between the first and the second structural entities at the location of the domes, and as the dome-like members change their shape, the distance between the first and second structural entity changes. At the location, where a dome is, the distance between the first and second structural entity can be larger than the height of a dome, but it cannot be smaller. With respect to an inertial coordinate system, either the first structural entity, the second structural entity or both the entities can move. In a electromechanical data input mechanism according to the invention, the first and second structural entities are arranged to move with respect to each other, under the influence of a pressing force exerted on a certain area within the pressing area, typically near an actuator, so that the actuator moves towards a respective dome-like member. The elastic properties of the second structural entity are substantially uniform within the pressing area. The elastic properties of the second structural entity are different at the locations of the actuators than in the area surrounding the actuators, but as the area of an actuator, which is typically only about a square millimeter, is very small compared to a typical pressing area of several square centimeters, the elastic properties in these point-like areas are insignificant when the whole second structural entity is considered. For example, if the second structural entity is a plate having a uniform thickness and having the actuators as extension on one of its surfaces, the elastic properties of the second structural entity are in this case dominated by the elastic properties of the plate and they are, consequently, substantially uniform. Especially, each actuator is not surrounded by a zone, which allows the actuator to move independently of the rest of the second structural entity. In an electromechanical data input mechanism according to the invention, a quite large portion of the second structural entity moves similarly as the actuator, and typically the movement of an actuator may cause also neighboring actuators to move slightly.

The first structural entity and the second structural entity can be substantially rigid entities, in which case the structural entities, under the influence of a force pressing them towards each other, typically tilt with respect to each other. It is also possible that the elastic properties of at least one of the first and second structural entities are arranged to be such, that an actuator together with a larger portion of the second structural entity moves towards the dome-like member because the first structural entity and/or the second structural entity bends.

Typically when the conductive area of a dome-like member touches the conductive coupling area, an electrical signal is generated, and this electrical signal is treated as an input signal. Typically there is a related electrical circuitry, which generates the electrical signals. In an electromechanical data input mechanism according to the invention, the first and second structural entities are typically arranged to move so much that the actuator presses the conductive area of the dome-like member against the conductive coupling area, which is on the surface of the first structural entity.

The number of dome-like members in an electromechanical data input mechanism according to the invention is at least one. Typically a few, for example four, dome-like members can be used, but it is also possible to have several dome-like members between the first and the second structural entities. Especially if the pressing area, within which the dome-like members typically are, is large and the functionality of an electromechanical data input mechanism according to the invention is based on one of the first and second structural entities to bend locally, the data input mechanism can comprise a large number of dome-like members.

The structure of an electromechanical data input mechanism according to the invention is simple and robust. The actuators are part of the second structural entity. They can be either made of the same material, for example during casting (e.g. injection molding or sheet metal forming) or they can be made of different material and be fixed to the second member, for example, using suitable adhesives. The assembly of a data input mechanism according to the invention is simple, because the number of parts is quite small. Separate buttons or key maps are not needed, and as a key mat, for example, is quite heavy compared to other parts of a small portable device, the weight of a portable device can also be reduced. The reduced amount of required material and the easy assembly also reduce costs. It is possible to make an electromechanical data input mechanism according to the invention waterproof quite easily, for example, by filling the gap between the first and second structural entities with suitable elastic material, which allows the first and second structural entities to move with respect to each other so that a conductive area of a dome-like member can be pressed against a conductive coupling area.

As a user presses the first and second structural entities towards each other, he can feel how the spring-like effect related to the dome-like member. The dome-like member resists slightly the pressing and, after its conductive area has been in contact with the conductive coupling area, it tries to retain its original shape, similarly as in conventional push button structures. Consequently, the user has a good tactile feel. This is one of the advantages of the invention.

A further advantage of the invention is that a certain area of the surface of an electronic device can be employed as an electromechanical data input mechanism in addition to another function. For example, in an area, where there is a display, an electromechanical data input mechanism according to the invention can be placed. It is also possible that a substantially thin cover of a device or a window of a device acts as the first or second structural entity of an electromechanical data input mechanism according to the invention. This way also the weight and size of a device can be reduced without cutting functionality of the device or reducing the usability of the device. Furthermore, an industrial designer has a more freedom to design a device, when an electromechanical data input mechanism according to the invention is used, because a need for separate push buttons can be eliminated using the invention.

BRIEF DESCRIPTION OF DRAWINGS

The invention is described below in more detail with reference to preferred embodiments and to the accompanying drawings where

In the drawings same reference numerals are used to refer to same parts. FIG. 1 is discussed in connection with the description of prior art push buttons.

DETAILED DESCRIPTION OF THE INVENTION

Figure 2A:
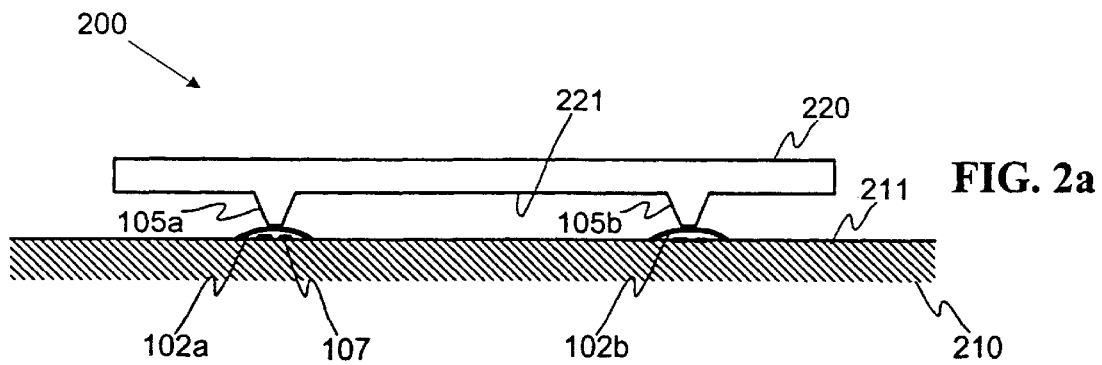
FIG. 2 presents schematically the structure of an electromechanical data input mechanism according to a first preferred embodiment of the invention.

FIG. 2 illustrates schematically the structure of an electromechanical data input mechanism 200 according to a first preferred embodiment of the invention. FIG. 2a illustrates a cross section of the data input mechanism 200, when there are no external forces pressing the first structural entity 210 and the second structural entity 220 towards each other. FIG. 2a presents the mechanism 200, for example, when a user is not pressing the data input mechanism. On top of the first surface 211 of a first structural entity 210 there are domes 102a, 102b. The domes can be, for example, a part of a dome sheet. The first structural entity 210 comprises conductive coupling areas, which are needed to convert the pressing of domes into electrical signals. This conversion is discussed in more detail in connection with the description of the prior art solutions. FIG. 2a presents conductive coupling areas 107, but they are not presented in the other figures accompanying this description. In FIG. 2a the domes are in a position, where their conductive area is not in contact with the conductive coupling areas. The actuators 105a, 105b are part of a second structural entity 220, which covers the domes.

Figure 2B:
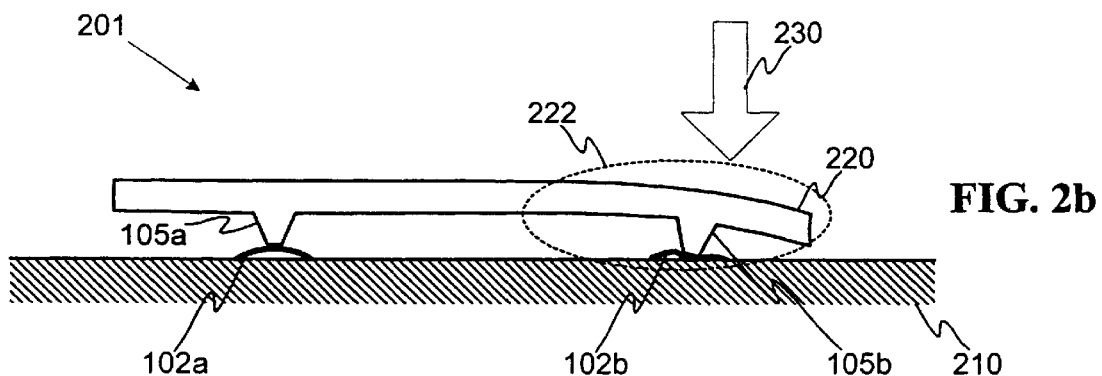
Figure 2C:
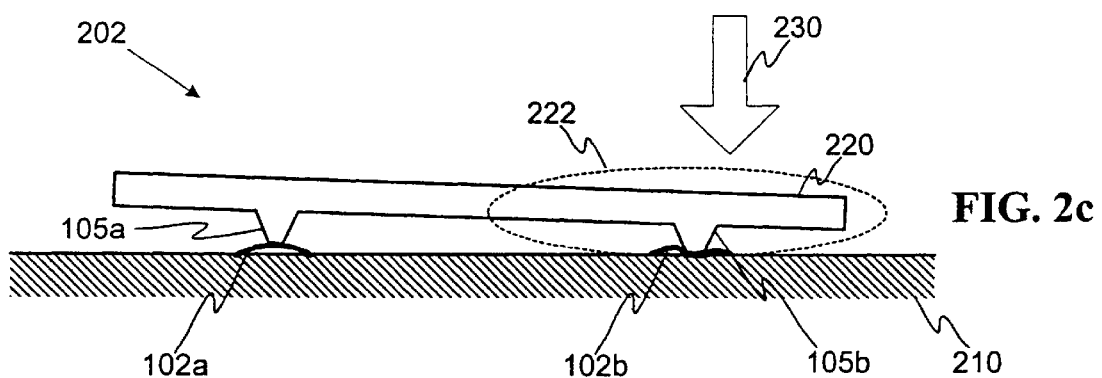

When the first and second structural entities are pressed towards each other, for example the second structural entity is pressed towards the first structural entity as arrow 230 indicates, the first and second structural entities are arranged to move with respect to each other. If, for example, the position of the first structural entity is fixed relative to the chassis of an electrical device, the elastic properties of the second structural entity can be such it bends (FIG. 2b) or the second structural entity can be rigid and it tilts (FIG. 2c) in the presence of an external force pressing the first and second structural entities towards each other. It is also possible that the second structural entity experiences both bending and tilting. It is also possible that the second structural entity is fixed relative to the chassis, and the first member bends and/or tilts. When the distance between the first and second structural entities substantially decreases because of the pressing, typically at least one of the domes is pressed against a conductive coupling area. In FIGS. 2b and 2c the conductive area of the dome 102b is in contact with the corresponding conductive coupling area, and the dome 102a is still in a position, where its conductive area is not in contact with a conductive coupling area.

The distance, which an actuator moves towards a dome, needed to make a conductive area of a dome to touch a conductive coupling area, depends on the size, shape and material of the dome, but it is typically less than a millimeter for domes used in small portable devices. For example, it may be sufficient that an actuator moves only about 0.2 mm towards the dome. The structure of the data input mechanism according to the invention, its operation principle (bending and/or tilting), and the elastic properties of the first and/or second structural entity can then be designed so that the position of the actuator changes enough under the influence of a typical pressing force.

In FIGS. 2b and 2c the portion of the second structural entity, which moves towards the dome 102b together with the actuator 105b, is marked with the dashed line 222. When the second structural entity bends under the influence of a pressing force, as FIG. 2b presents, the portion of the second structural entity bending has a considerably larger area than the area of an actuator. For example, the area of an actuator relating to a dome, which has a diameter of about 3–5 mm and bends about 0.2–0.5 mm, is typically about 1–2 mm². Consider, for example, that a user pressing the second structural entity with his finger. In this case the area, upon which a pressing force is exerted, is about one square centimeter. Depending on the elastic properties of the second structural entity, a portion 222 having the area of a few square centimeters may move towards the dome. It is possible that the portion includes also other actuators than the actuator 105b, but when the pressing force is exerted on an area near the actuator 105b the other actuators are typically not moved towards their corresponding domes so much that the conductive areas of the corresponding domes touch the corresponding coupling areas. If the first structural entity is arranged to bend, in an inertial coordinate system a portion of the first structural entity moves, but if a relative motion is considered, again a certain portion of the second structural entity together with an actuator is moving towards a dome. If the first or second structural entity is substantially rigid and arranged to move as a whole entity, as FIG. 2c presents, the portion 222 of the second structural entity moving towards a dome is typically larger than if one of the first and second structural entity is bending.

Figure 3:
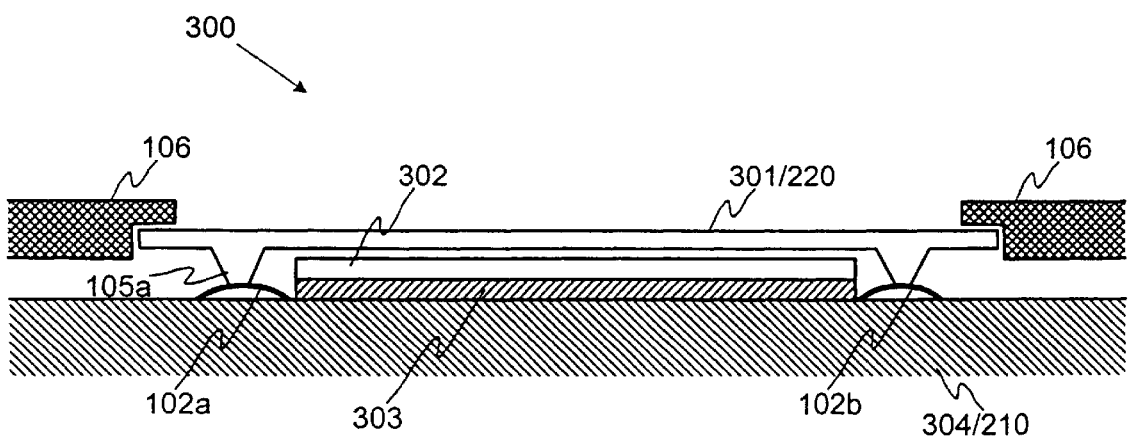
FIG. 3 presents schematically an electromechanical data input mechanism according to a second preferred embodiment of the invention.

FIG. 3 presents schematically a data input mechanism 300 according to a second preferred embodiment of the invention. In this second preferred embodiment of the invention, a printed circuit board 304 acts as the first structural entity. The domes 102a; 102b are located adjacent to the printed circuit board 304. A plate 301, which has actuators 105a; 105b extending from the surface facing the printed circuit board, acts as the second structural entity 220. A cover 106 having a suitable opening for the plate 301 is also presented in FIG. 3. The cover 106 can be used to press the plate 301 slightly against the domes 102a, 102b. The opening allows the edges of the plate 301 to be bent towards the printed circuit board or the plate 301 to tilt slightly.

The plate 301 may be, for example, a transparent window or a decorative plate having a different color or material than the cover 106. If the plate 301 is a transparent window, it is advantageous to put a display element 303 between the printed circuit board 204 and the transparent window 301. The display element may be, for example, a liquid crystal display (LCD). A light guide 302 may be needed in addition to the display element 303 to obtain display illumination. The light guide leads light emitted, for example, from LEDs to the display element. The display illumination can be either backlighting, in which case the display element is between the light guide and the window, or a frontlighting, where the light guide is between the display element and the window. Typically there is a small gap between the lower surface of the window plate 301 and the possible elements placed between the printed circuit board and the window plate 301 to allow the window plate 301 and the printed circuit board 304 to move with respect to each other. During the influence of a pressing force the window plate 301 bends or tilts typically so little that the image quality remains the same as when the window plate 301 is aligned with the display element 303.

Figure 4A:
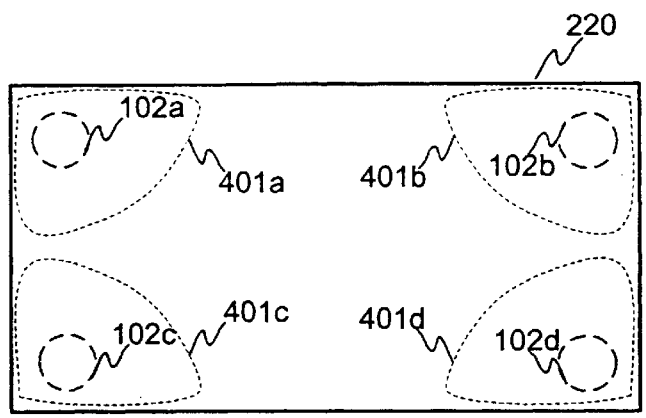
FIG. 4 presents a top view of an electromechanical data input mechanism according to the invention.
Figure 4B:
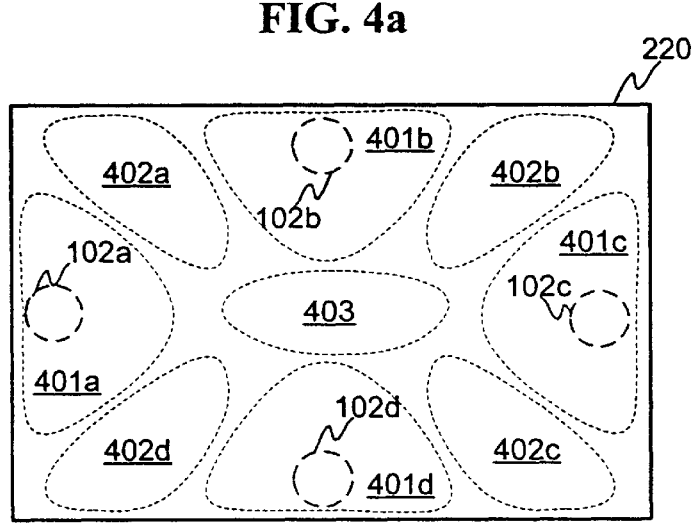

FIG. 4 presents a top view of a data input mechanism according to the invention. The plate-like second structural entity 220 has, as an example, a rectangular shape in FIG. 4 and, as an example, there are four domes between the first and the second structural entities. In FIG. 4a the domes 102a; 102b; 102c; 102d are placed in the corners of a plate-like second structural entity 220, and in FIG. 4b they are place in the middle of the sides of the plate-like second structural entity 220. If the first structural entity is assumed to be rigid, depending on the elastic properties of the plate 220 and on the elastic properties of the domes, the area, where the plate 220 can be pressed to result a dome to touch a corresponding conductive coupling area, may differ. In FIGS. 4a and 4b examples of such areas 401a; 401b; 401c; 401d are illustrated for each dome 102a; 102b; 102c; 102d. For example, to press a conductive part of the dome 102a against a conductive coupling area on a printed circuit board, the plate 220 is pressed near the top left corner of the plate in FIG. 4a, at the area 401a.

Especially if the plate-like second structural entity 220 is arranged to tilt when it is pressed towards the first structural entity, it is possible to press the plate-like second structural entity 220 towards the first structural entity in a position between two domes (for example in area 402a in FIG. 4b) and obtain the conductive areas of two domes (domes 102a and 102b) to touch the corresponding conductive coupling areas. The electrical signals related to two domes, which signals are generated at the same time, can be interpreted as a new input signal, and it is possible to simulate the operation of, for example, eight domes (push keys) using only four domes. FIG. 4b shows an example of the areas 402a; 402b, 402c, 402d where the pressing of the plate-like second structural entity 220 results in the pressing of two domes against the printed circuit board. Typically two domes do not touch the conductive coupling areas exactly at the same time, but it is possible to add to the electronic circuitry related to the electromechanical data input mechanism some logic relating to this or do the same within software in a keyboard interface block. For example, if a second signal, related to a second dome, becomes active within a certain time period after a first signal, related to a first dome, has become active, and the signals stay active at least for a certain predefined time period, this can be interpreted as an input signal corresponding to the two domes.

Furthermore, especially when the plate-like second structural entity 220 is arranged to tilt, it is possible to press the plate-like second structural entity in the middle of the plate and obtain all domes below the plate-like second structural entity 202 to touch the conductive coupling areas. This can be interpreted again as a new input signal, in addition to those input signals corresponding to the separate domes and in addition to the possible input signals corresponding to the dome pairs. In FIG. 4b the area, pressing upon which the conductive areas of four domes 102a; 102b; 102c; 102d touch the corresponding conductive coupling areas, is marked with dashed line 403. Again, typically not all four signals related to the domes are activated at the same time, so similar logic as described above for two domes can be applied to four domes.

Similar operation can be achieved with a bending plate, which acts as the second structural entity 220, when the plate is pressed in a large area compared to the diameter of a dome. The area of a display of a mobile station, for example, is typically a few square centimeters. If the display area acts simultaneously as an electromechanical data input mechanism according to the invention, a user typically presses the display with his thumb. The display window, which acts as a second structural entity of an electromechanical data input mechanism according to the invention, is therefore pressed at an area covering typically one square centimeter. The diameter of a dome is typically 3–5 mm and two domes may be about two centimeter apart from each other. A thumb pressing the display window may thus easily bend the window so that two domes are pressed towards the surface of, for example, a printed circuit board, if the elastic properties of the display window are suitably selected.

One example of a signal that can be related to all domes of a data input mechanism according to the invention is a wake up signal. An electrical device may turn its power off, for example, if a user does not use the device for a certain time. In the power off state, it is possible to interpret a situation, where the signals related to all the domes of the input mechanism are active at the same time, as a wake up signal which causes the electric device to turn the power on. This way an input data mechanism according to the invention, together with automatic power off functionality, can replace a conventional power on/off push button.

Figure 5:
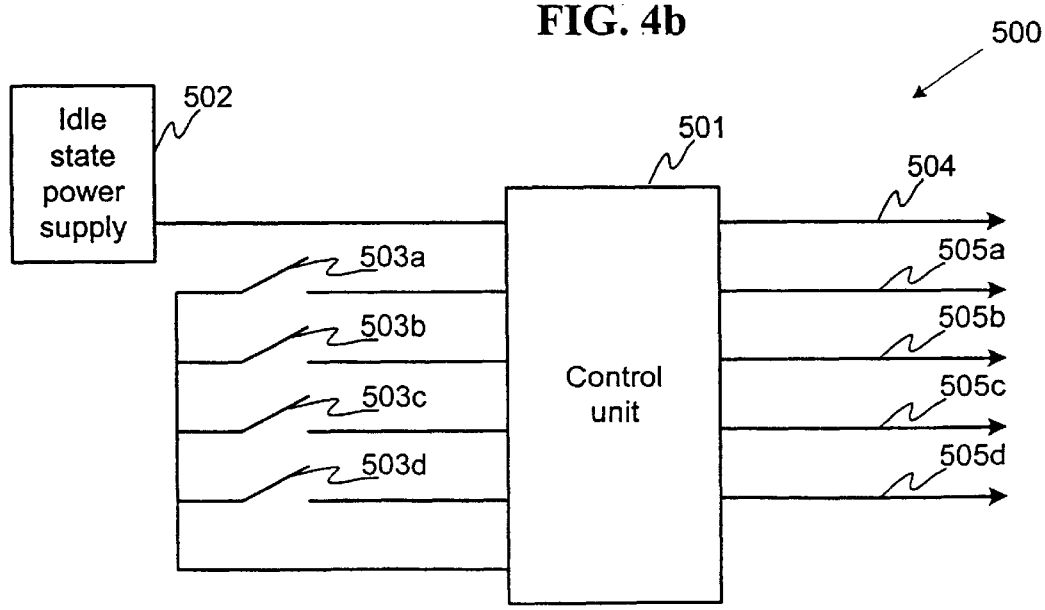
FIG. 5 presents schematically an example of an electrical circuitry, which can be added to an electromechanical data input mechanism according to the invention.

Furthermore, since the automatic power off functionality may eliminate the need for a separate key using which it is possible to turn the power off from a device, a separate power off signal is not necessary needed either. Therefore it is possible that when the device is in the power on state, a second input signal—other than the wake up signal—is related to all domes being simultaneously pressed against the conductive coupling areas. FIG. 5 presents schematically an electrical circuit 500 related to the wake up signal. A control unit 501 is powered by an idle state power supply 502 during the idle state. The switches 503a; 503b; 503c; 503d present the domes. A switch 503a; 503b; 503c; 503d is closed when the conductive area of a dome touches the corresponding conductive coupling area. The signal related to each dome is active, when the switch is closed. If all the switches are closed simultaneously (taking into account a possible delay and the duration of the switches being closed) and if the device is in the power off mode, a wake up signal 504 is sent forward. If the device is in the power on mode, the control circuit 501 indicates the status of the switches using the outputs 505a; 505b; 505c; 505d. This means that is does not sent the wake up signal in the power on mode, even if all switches 503a; 503b; 503c; 503d are closed at the same time. These outputs 505a; 505b; 505c; 505d are typically connected to a keyboard interface. An electrical circuit 500 can be easily constructed, for example, as a small hardware block. Alternatively, the switches can be connected serially after each other to perform the same function. In this case the control circuit receives a wake-up signal when all switches are simultaneously closed.

The number of domes presented in FIG. 4 is just an example. An electromechanical data input mechanism according to the invention may comprise any number of domes. Typically the number of domes and their location depends on the area of the electromechanical data input mechanism and on the operation principle of the electromechanical data input mechanism. If the operation is based on tilting a rigid plate, it usually is not possible to place many domes between the first and second structural entity of the data input mechanism. Bending a plate locally, on the other hand, enables the controlling of the position of many domes.

It is possible to construct an electromechanical data input mechanism according to the invention that contains only one dome-like member. Such a mechanism can replace a single push button. The second structural entity may, for example, be arranged to move in a direction perpendicular to the first and second surface. For example, a chassis of a device may have an opening, which controls the movement of a relative thick plate having one actuator extending from its surface. In this case, the second structural element is typically rigid. As a second example, a thin cover of a device, wherefrom an actuator extends towards a dome, may act as the second structural element. The thin cover bends as it is pressed, and causes the actuator to move towards the dome.

Figure 1:
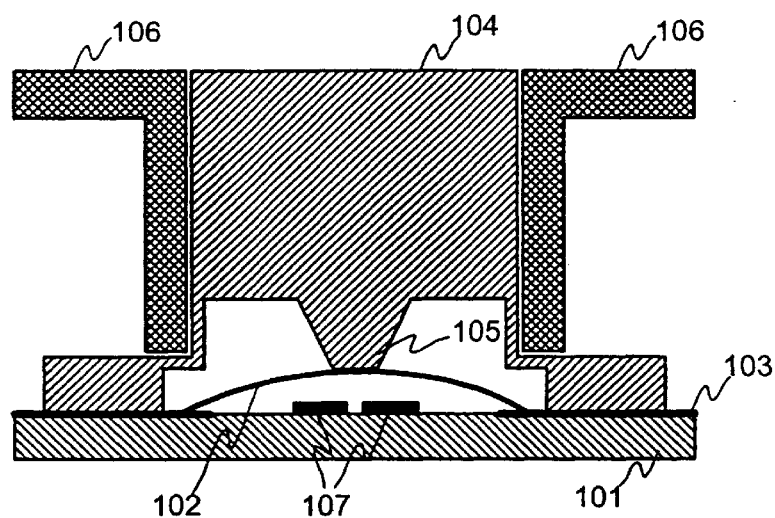
FIG. 1 presents the structure of a prior-art push button.
Figure 6:
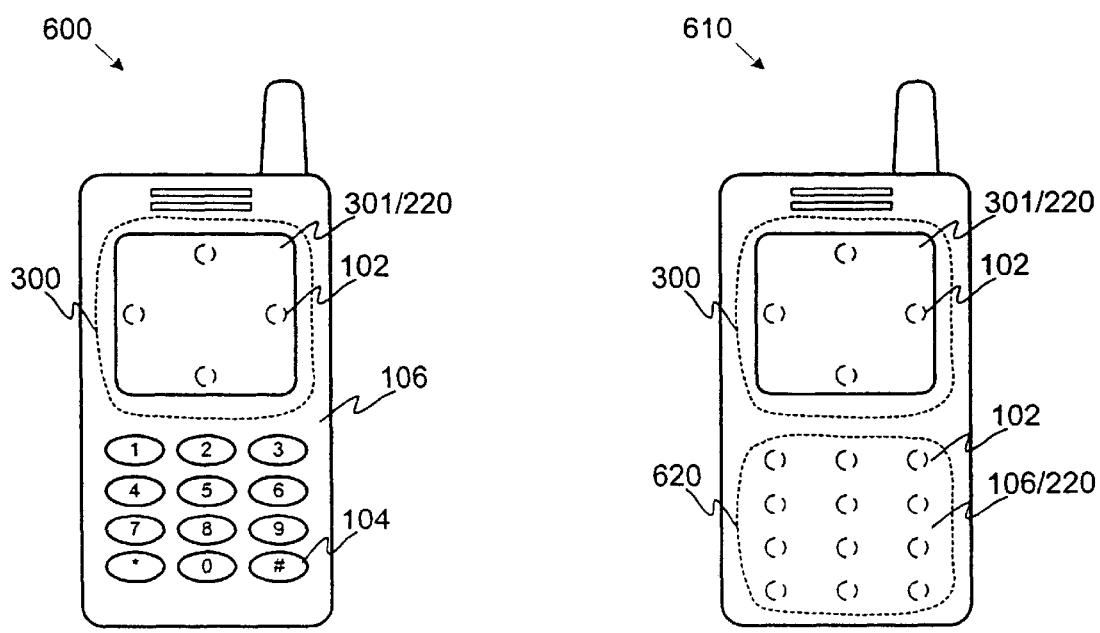
FIG. 6 presents two portable communication devices according to the invention.

FIG. 6 presents examples of an electrical device according to the invention. A mobile station 600 comprises conventional push buttons 104 for inputting digits. In the display area 301 of the mobile station 600 there is an electromechanical data input mechanism according 300 to the second preferred embodiment of the invention. The domes 102 are located in the middle of the sides of the window 301. The electromechanical data input mechanism 300 of the mobile station 600 can thus conveniently be used as arrow keys. It is also possible that more input signals are generated using the four domes, as discussed above. In the mobile station 610 also the digit push buttons are replaced with a second electromechanical data input mechanism 620 according to the invention. In the second electromechanical data input mechanism 620 the cover 106 of the mobile station acts as the second structural entity of the electromechanical data input mechanism. It is also possible that an electric data input mechanism according to the invention is placed, for example, in a sliding cover or some other part of a mobile station. The area, where the microphone or the earpiece is, is another example of a part of a communication device where an electromechanical data input mechanism according to the invention can be integrated.

In addition to mobile phones, an electromechanical data input mechanism according to the invention can be applied, for example, in lap top computers, in personal organizers (palm top devices) or, basically, in any electrical devices where there is need for push buttons or a key board. In lap top computers and personal organizers it is especially advantageous to use a data input mechanism according to the invention, where a display component is placed below a window and the window acts as a second structural entity of the data input mechanism, as presented in FIG. 3.

Figure 7A:
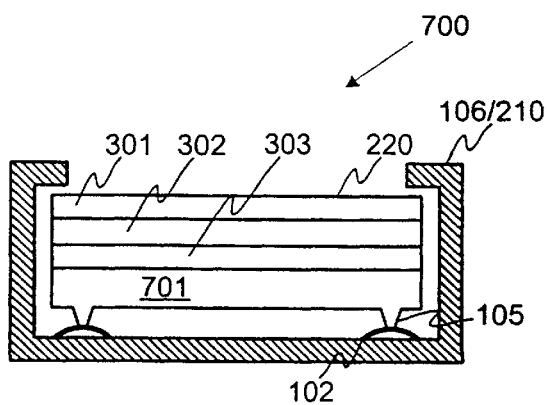
FIG. 7 presents schematically cross-sections of electromechanical data input mechanisms according to a third preferred embodiment of the invention.
Figure 7B:
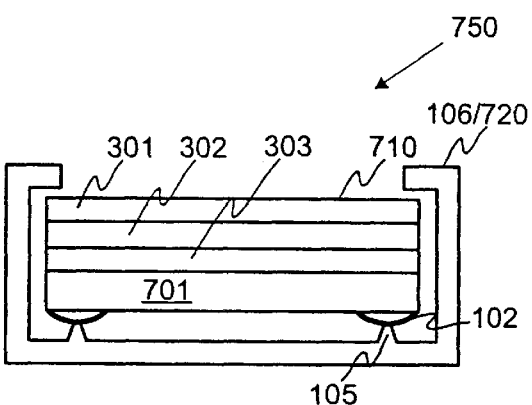

FIG. 7 illustrates schematically electronic data input mechanisms 700; 750; 760 according to a third preferred embodiment of the invention. In the data input mechanism 700 presented in FIG. 7a, the chassis 106 of a device acts as a first structural entity 210 of the mechanism 700. The second slab-like structural entity 220 comprises various integrated parts: for example, on top there is a window 303, below which there is a light guide 302, a display element 301 and an engine module 701. The engine module is responsible for the operation of the device. In the bottom of the slab-like structural entity 220 there are the actuators 105. Domes 102 are between the actuators and the first structural entity 201 (chassis of the device). The conductive coupling areas are on the surface of the chassis in the data input mechanism 700. The data input mechanism 750 in FIG. 7b is quite similar to the data input mechanism 700, but here the chassis 106 of the device acts as a second structural entity 720 of the electromechanical data input mechanism 750. The actuators 105 are part of the chassis 106 in this case, and the conductive coupling areas are in the first structural entity 710 comprising also the window 303, the light guide 302, the display element 301 and the engine module 701 of the device.

In the data input mechanisms 700 and 750, where electronic circuitry, for example a printed circuit board or the engine module 701, is part of a structural entity movable with respect to the chassis, then it is advantageous to make the movable structural entity as rigid as possible. Otherwise the reliability of flip chip solder joint, for example, can be reduced. It is thus reasonable to make the second structural entity 220 in mechanisms 700 and the first structural entity 710 in mechanism 750 so rigid that a force related to the normal use of the data input mechanism does not cause bending, which might break, for example, flip chip solder joints.

Figure 7C:
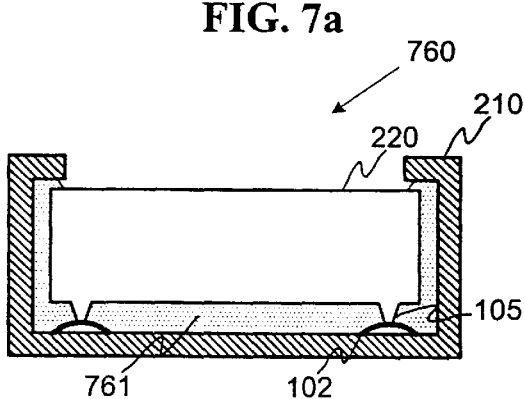

FIG. 7c illustrates a slightly modified data input mechanism 760 when compared to the mechanism 700. Here the gap between the second structural entity 220 and the first structural entity 106/210 is filled with a suitable elastic material 761, for example elastomer, that allows the second structural entity 220 to move slightly with respect to the first structural entity 210 and allows the domes to change their shape. The electromechanical data input mechanism 760 is waterproof, and additionally the elastic material between the chassis and the engine module may improve heat dissipation from the engine module. Compared to conventional structures, where a separate sealed push button assembly is usually needed to achieve a waterproof structure, the data input mechanism 760 is simple, robust, easy to manufacture and cost effective. In addition, as a need for separate push buttons can be eliminated, the designer of a device has more freedom to shape a device having an electromechanical data input mechanism 760 or another data input mechanism according to the invention.

The data input mechanism according to the third preferred embodiment of the invention can be advantageously utilized in very small electrical devices, as the chassis of the device forms a part of the data input mechanism.

Figure 8:
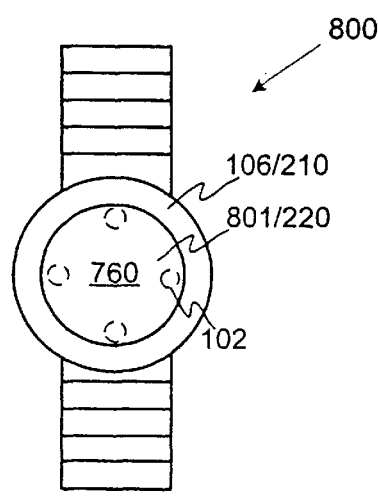
FIG. 8 presents a communication device according to the invention.

FIG. 8 presents, as an example, a communication device 800 called a watch phone according to the invention. The cross section of the communication device can be that presented, for example, in FIG. 7c. The reference numbers 210 and 220 in FIG. 8 are consistent with the cross section in FIG. 7c. The operation options are displayed to the user using a circular display area 801. The circular display area 801 is the top part of a first or second structural entity of an electromechanical data input mechanism according to the invention, and the user activates the desired option by pressing the display area 801. In FIG. 8 presents, as an example, four domes 102 between the first and the second members of the electromechanical data input mechanism. As the diameter of the display of a watch phone is typically about 3 centimeters, it may not be feasible to have more than four domes in an electromechanical data input mechanism according to the invention in a watch phone. Of course, the shape of the watch phone can also be non-circular, such as rectangular, oval, elliptic or freely formed. If the user presses the display area 801 with a pen-like or a needle-like instrument, it may be possible to have more domes in the electromechanical data input mechanism in the device.

Figure 9:
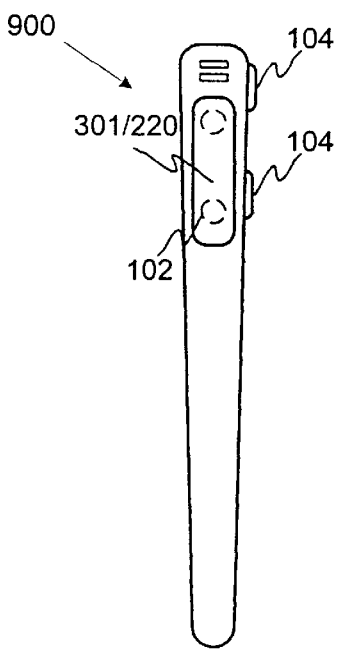
FIG. 9 presents a further communication device according to the invention.

FIG. 9 presents, again as an example, a communication device 900 called a pen phone according to the invention. The communication device 900 comprises, as an example, two push buttons 104. In addition, a data input mechanism according to the invention is integrated with a display area 301. The cross section of the data input mechanism can be, for example, similar to that presented in FIG. 3 or in FIG. 7. As the display 301 is typically elongated in a pen phone, it is usually most feasible to place the domes in its electromechanical data input mechanism in a row. FIG. 9 presents two domes, but it is also possible to have, for example, a third dome in the middle of the display area if the operation of the data input mechanism in the communication device 900 is based on the first or the second structural entity of the data input mechanism to bend locally.

In this description and in the accompanying claims, the directions are meant to clarify the description and the relative position of the parts of the data input mechanism. The directional terms do not restrict the invention to relate to data input mechanisms at certain position or direction.

What is claimed is:

1. An electromechanical data input mechanism, comprising:
   a first structural entity,
   a second structural entity arranged to move with respect to said first structural entity and having certain elastic properties,
   as a part of said first structural entity, a first surface,
   as a part of said second structural entity, a second surface located adjacent to said first surface and separated therefrom substantially by a gap, a first conductive coupling area on said first surface, a second conductive coupling area on said first surface, between said first and second surfaces and adjacent to said conductive coupling area a first dome-like member and a second dome-like member, each of said first and second dome-like members having a conductive surface adjacent to the respective conductive coupling area, and extending from the second surface, a first actuator located adjacent to the first dome-like member and a second actuator located adjacent to the second dome-like member;

wherein:

the mechanism provides a pressing area for exerting a force pressing the first and second structural entities towards each other, substantially within which pressing area the first and second dome-like members are located, within the pressing area, the elastic properties of the second structural entity are substantially uniform, said first and second structural entities are within the pressing area kept apart from each other solely through the dome-like members, under the influence of a force exerted on a first area within the pressing area, said first and second structural entities are arranged to move, with respect to each other, so that the first actuator moves towards the first dome-like member, under the influence of a force exerted on a second area within the pressing area, said first and second structural entities are arranged to move with respect to each other so that the second actuator moves towards the second dome-like member, and under the influence of a force exerted on a third area within the pressing area, said first and second structural entities are arranged to move with respect to each other so that the first actuator moves towards the first dome-like member, and the second actuator moves towards the second dome-like member.

2. An electromechanical data input mechanism according to claim 1, wherein the first structural entity and the second structural entity are arranged to move with respect to each other as whole structural entities.

3. An electromechanical data input mechanism according to claim 1, wherein the second structural entity is arranged to experience under the influence of the pressing force an elastic deformation so that a portion of the second structural entity and said actuator move towards said dome-like members.

4. An electromechanical data input mechanism according to claim 1, wherein the first structural entity is arranged to experience under the influence of the pressing force an elastic deformation so that said portion and said actuator move towards said dome-like member.

5. An electromechanical data input mechanism according to claim 1, wherein under the influence of a force exerted on a third area within the pressing area, said first and second structural entities are arranged to move with respect to each other so that all actuators constituting a part of the electromechanical data input mechanism move towards the dome-like members constituting a part of the electromechanical data input mechanism.

6. An electromechanical data input mechanism according to claim 5, wherein the third area is substantially in the middle of the pressing area.

7. An electromechanical data input mechanism according to claim 5, further comprising electrical circuitry, which, when the conductive areas of all the dome-like members are in contact with the corresponding conductive coupling areas at the same time for a certain predefined time, is arranged to generate a first signal, when a device, of which the electromechanical data input mechanism constitutes a part of, is in a power off mode, and a second signal, when said device is in a power on mode.

8. An electromechanical data input mechanism according to claim 1, wherein the dome-like members are located substantially symmetrically in a vicinity of the perimeter of the pressing area.

9. An electromechanical data input mechanism according to claim 8, wherein the pressing area is polygonal and the dome-like members are in a vicinity of the corners of the pressing area.

10. An electromechanical data input mechanism according to claim 9, wherein the pressing area is rectangular and the dome-like members are in a vicinity of the corners of the pressing area.

11. An electromechanical data input mechanism according to claim 8, wherein the pressing area is polygonal and the dome-like members are in a vicinity of the middle points of the sides of the polygonal pressing area.

12. An electromechanical data input mechanism according to claim 11, wherein the pressing area is rectangular.

13. An electromechanical data input mechanism according to claim 8, wherein the pressing area is circular.

14. An electromechanical data input mechanism according to claim 8, wherein the pressing area is oval.

15. An electromechanical data input mechanism according to claim 1, wherein said second structural entity is a plate having said actuator as an extension.

16. An electromechanical data input mechanism according to claim 15, wherein at least a part of said plate is transparent.

17. An electromechanical data input mechanism according to claim 16, further comprising a third member, which is a planar member between said first and second structural entities and which comprises a display element, so that information being displayed with the display element is viewable through the transparent part of the plate.

18. An electromechanical data input mechanism according to claim 16, wherein:

said plate comprises a transparent layer and a planar display element, said transparent layer being on the opposite side of the plate than the actuator, and the information being displayed with the display element is viewable through the transparent layer.

19. An electromechanical data input mechanism according to claim 1, wherein said first structural entity is a plate.

20. An electromechanical data input mechanism according to claim 19, wherein said plate has a transparent layer and a planar display element, said transparent layer being on the opposite side of the plate than the first surface, and the information being displayed with the display element is viewable through the transparent layer.

21. An electromechanical data input mechanism according to claim 1, wherein the gap is at least partly filled with an elastic material allowing the first and second structural entities to move with respect to each other.

22. An electromechanical data input mechanism according to claim 1, wherein the number of dome-like members between said first and second surfaces is equal to a positive integer greater than one, and as many actuators extend from the second surface as there are dome-like members between said first and second surfaces.

23. An electromechanical data input mechanism according to claim 1, wherein the gap is at least partly filled with a member allowing the first and second structural entities to move with respect to each other and joining the entities to each other.

24. An electronic device, comprising:

an electromechanical data input mechanism, and within said electromechanical data input mechanism a first structural entity, a second structural entity arranged to move with respect to said first structural entity and having certain elastic properties, as a part of said first structural entity, a first surface, as a part of said second structural entity, a second surface located adjacent to said first surface and separated therefrom substantially by a gap, a first conductive coupling area on said first surface, a second conductive coupling area on said first surface, between said first and second surfaces and adjacent to said conductive coupling area a first dome-like member and a second dome-like member, each of said first and second dome-like members having a conductive surface adjacent to the respective conductive coupling area, and extending from the second surface, a first actuator located adjacent to the first dome-like member and a second actuator located adjacent to the second dome-like member;

wherein:

said mechanism provides a pressing area for exerting a force Pressing the first and second structural entities towards each other, substantially within which pressing area the dome-like members are located, within the pressing area, the elastic properties of the second structural entity are substantially uniform, said first and second structural entities are within the pressing area kept apart from each other solely through the dome-like members, under the influence of a force exerted on a first area within the pressing area, said first and second structural entities are arranged to move, with respect to each other, so that the first actuator moves towards the first dome-like member, under the influence at a force exerted on a second area within the pressing area, said first and second structural entities are arranged to move with respect to each other so that the second actuator moves towards the second dome-like member, and under the influence of a force exerted on a third area within the pressing area, said first and second structural entities are arranged to move with respect to each other so that the first actuator moves towards the first dome-like member, and the second actuator moves towards the second dome-like member.

25. An electronic device according to claim 24, the device being a portable device.

26. An electronic device according to claim 25, the device being a portable telecommunication device.

27. An electronic device according to claim 26, the device being a mobile phone.

28. An electronic device according to claim 25, the device having an outer appearance of a wrist watch.

29. An electronic device according to claim 25, the device having an outer appearance of a pen.

30. An electrical device according to claim 24, wherein the first structural entity is a chassis of the electrical device.

31. An electrical device according to claim 24, wherein the second structural entity is a chassis of the electrical device.

32. An electrical device according to claim 24, the device being a computer.

33. An electrical device according to claim 32, the device being a portable computer.

34. An electromechanical data input mechanism, comprising:

a first structural entity, a second structural entity arranged to move with respect to said first structural entity, as a part of said first structural entity, a first surface, as a part of said second structural entity, a second surface located adjacent to said first surface and separated therefrom substantially by a gap, a conductive coupling area on said first surface, between said first and second surfaces and adjacent to said conductive coupling area a dome-like member having a conductive surface adjacent to the conductive coupling area, and extending from the second surface, an actuator located adjacent to the dome-like member;

wherein:

the mechanism provides a pressing area for exerting a force pressing the first and second structural entities towards each other, substantially within which pressing area the dome-like member is located, within the pressing area, the elastic properties of the second structural entity are substantially uniform, under the influence of a force exerted on a first area within the pressing area, one of said first and second structural entities is arranged to bend, so that the first actuator moves towards the dome-like member.

35. An electronic device, comprising:

an electromechanical data input mechanism, and within said electromechanical data input mechanism a first structural entity and a second structural entity arranged to move with respect to said first structural entity, so that one of said first and second structural entities also constitutes a chassis of the electronic device and the other of said first and second structural entities comprises electronic circuitry, as a part of said first structural entity, a first surface, as a part of said second structural entity, a second surface located adjacent to said first surface and separated therefrom substantially by a gap, a conductive coupling area on said first surface, between said first and second surfaces and adjacent to said conductive coupling area a dome-like member having a conductive surface adjacent to the respective conductive coupling area, and extending from the second surface, an actuator located adjacent to the dome-like member;

wherein:

said mechanism provides a pressing area for exerting a force pressing the first and second Structural entities towards each other, substantially underneath which pressing area the dome-like member is located, under the influence of a force exerted on an area within the pressing area, said first and second structural entities are arranged to move, with respect to each other, so that the actuator moves towards the dome-like member.

36. An electromechanical data input mechanism according to claim 35, further comprising a third member, which is a planar member between said first and second structural entities and which comprises a display element, so that information being displayed with the display element is viewable through the transparent part of the plate.

37. An electromechanical data input mechanism according to claim 35, wherein said first structural entity is a plate.

38. An electromechanical data input mechanism according to claim 37, wherein:

said plate comprises a transparent layer and a planar display element, said transparent layer being on the opposite side of the plate than the actuator, and the information being displayed with the display element is viewable through the transparent layer.

39. An electromechanical data input mechanism according to claim 37, wherein said plate has a transparent layer and a planar display element, said transparent layer being on the opposite side of the plate than the first surface, and the information being displayed with the display element is viewable through the transparent layer.

40. An electromechanical data input mechanism according to claim 35, wherein the gap is at least partly filled with an elastic material allowing the first and second structural entities to move with respect to each other.

41. An electromechanical data input mechanism according to claim 35, wherein the number of dome-like members between said first and second surfaces is equal to a positive integer greater than one, and as many actuators extend from the second surface as there are dome-like members between said first and second surfaces.

42. An electronic device according to claim 35, the device being a portable telecommunication device.

43. An electronic device according to claim 35, the device being a mobile phone.

44. An electromechanical data input mechanism according to claim 35, wherein the gap is at least partly filled with a member allowing the first and second structural entities to move with respect to each other and joining the entities to each other.

* * * * *